Feb. 5, 1946. L. W. SCHAPER 2,394,491
LOCK NUT
Filed July 2, 1943
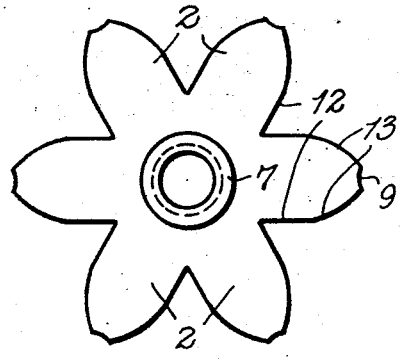
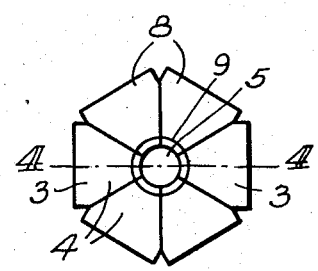
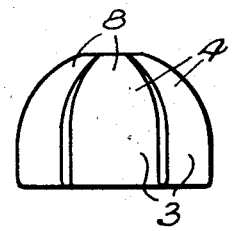
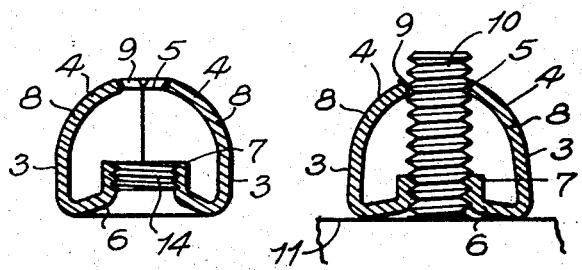
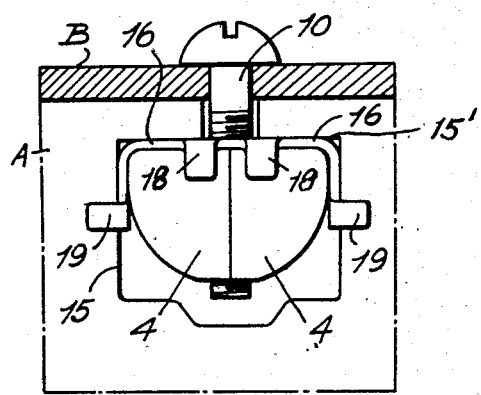
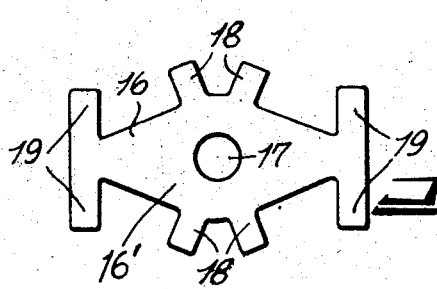
INVENTOR
LEONARD W. SCHAPER.
BY E.W. Anderson & Son.
ATTORNEY Patented Feb. 5, 1946

2,394,491

UNITED STATES PATENT OFFICE 2,394,491

LOCK NUT

Leonard W. Schaper, Livingston, N. J., assignor to Monroe Calculating Machine Company, Orange, N. J., a corporation of Delaware Application July 2, 1943, Serial No. 493,270

2 Claims. (Cl. 85—32)

The invention relates to friction lock nuts, an object being to provide an improved device of this description, capable of being made of resilient sheet metal. Another object is to provide means, including the friction lock nut of this invention, for clamping together two right angularly disposed plates. Other objects and advantages will appear hereinafter or will be obvious.

The invention consists in the novel construction and combinations of parts as hereinafter set forth in the claims.

In the accompanying drawing:

Figure 1 is a plan view of the blank after the same is formed with the central screw threaded extension.

Figure 2 is a plan view of the friction lock nut.

Figure 3 is a side view of the same.

Figure 4 is a section on the line 4—4, Figure 2.

Figure 5 is a view similar to Figure 4, showing the nut engaged with the bolt and with the assembly or carrier.

Figure 6 is a side view of the friction lock nut, shown as used with the bolt and the insert in securing together two right angularly disposed plates, one of which plates is shown in section.

Figure 7 is a detail plan view of the insert.

In the drawing, the nut is shown as formed of a blank of resilient sheet metal such as cold rolled steel, said blank having a continuous series of petal like radial extensions 2 the radial length of which is greater than their breadth, said nut including a hollow body having flat sides 3 adapted to form a wrench hold, a tapered top 4 having a central aperture 5, and a dished base 6 having a short central hollow cylindrical screw threaded upper extension 7, located within said hollow body spaced from said top and the longitudinal axis of which is aligned with the center of said aperture, said sides and said top being formed of said radial extensions bent upwardly from said base and constituting spring fingers 8, the free ends 9 of which define said aperture and are located in a plane (considering said spring fingers as of negligible thickness) at right angles to the longitudinal axis of said nut.

The central aperture 5 is of such extent that the spring fingers 8 will be forced outwardly against the tension of the spring thereof and have at their free ends 9 initial-resilient frictional engagement with the threaded portion of a bolt 10 engaged with said screw threaded extension 7, and when the nut is screwed home upon said bolt to press the peripheral portion of its dished base against a flat abutment surface 11 of the assembly or carrier, said spring fingers will be further forced outwardly against the tension of the spring thereof and have at the free ends 9 thereof final increased frictional and locking engagement with the threaded portion of said bolt, thereby causing the nut to be self locked against chance of working loose.

In the process of manufacture, the blank for the nut is stamped from resilient sheet metal such as cold rolled steel, and includes a central portion having a small central perforation and the aforesaid petal like radial extensions 2, shown as six in number, and each having the inner portion thereof provided with parallel lateral edges 12 and the outer portion provided with converging arcuate lateral edges 13, each radial extension having an arcuate outer free end 9.

In this process of manufacture, said central portion is dished as shown at 6 to provide a base or bottom for the hollow body of the nut and the material of the blank about said central perforation is extruded to form the short central hollow cylindrical upper extension 7; the petal like radial extensions 2 are bent upwardly from said base to form the flat sides 3 and the tapered top 4 of said hollow body and to form the spring fingers 8 of which said sides and top are composed, and the hollow cylindrical upper extension 7 is provided with an internal screw thread 14.

In the use of the invention in means for securing together two right angularly disposed plates A and B of an assembly or carrier (Figure 6) one of the plates is provided with a notch 15, wherein is located the nut and the other plate is provided with a perforation loosely engaged by the bolt 10, said bolt also loosely engaging a contracted entrance of said notch, and when screwed within the nut having the effect of drawing the nut against the outer edge wall 15' of said notch to clamp the two plates together.

In this use of the invention, an insert 16 is interposed between the dished base of the nut and the outer edge wall 15' of the notch said insert providing the aforesaid flat abutment surface for the dished base of the nut and being provided with a central perforation 17 loosely engaged by said bolt. This insert has a portion 16' marginal to said perforation and engaged by and forming a bearing for every point of the periphery of said dished base, whereby the free ends 9 of said spring fingers are adapted to have final increased resilient frictional and locking engagement with the threaded portion of the bolt upon screwing the bolt home.

In order to fix the nut in position within said notch against rotary movement and against movement of escape to either side and thus secure the parts in proper relative position, the insert is provided with opposite lugs 18 bent to engage opposite of the flat sides of the nut and with opposite lugs 19 bent to engage opposite sides of the notched plate marginal to the notch.

I claim:

1. A friction lock nut formed entirely of resilient sheet metal of the same thickness throughout and the blank for which has a continuous series of radial tapered petal-like extensions, the radial length of which is greater than their breadth including a hollow body having flat sides forming a wrench hold, a top provided with a central opening, and a dished base having a short hollow cylindrical screw threaded extension the longitudinal axis of which is aligned with the center of said opening, said screw threaded extension being located within and spaced from the top of said hollow body, said sides and said top being formed of said radial extensions bent upwardly from said base and constituting spring fingers the free ends of which define said opening, said spring fingers having at the free ends thereof initial movable engagement with the threads of a bolt engaged with said screw threaded extension and final resilient frictional locking engagement with said threads upon screwing the nut home to press said dished base against a flat abutment surface.

2. Means for clamping two right angularly disposed plates together, one of which plates is provided with a notch having a contracted entrance and the other with a perforation, including a friction lock nut of resilient sheet metal located within said notch and the blank for which is provided with a continuous series of radial petal-like extensions, the radial length of which is greater than their breadth said lock nut including a hollow body having flat sides forming a wrench hold, a top provided with a central opening, and a dished base having a short central hollow cylindrical screw threaded extension the longitudinal axis of which is aligned with the center of said opening, said screw threaded extension being located within and spaced from the top of said hollow body, said sides and said top being formed of said radial extensions bent upwardly from said base and constituting spring fingers the free ends of which define said opening, said spring fingers having at their free ends initial movable engagement with the threads of a bolt engaging said screw threaded extension, said contracted entrance and said perforation, and final resilient frictional locking engagement with said threads upon screwing the bolt home to press said dished base of the nut against a flat abutment surface, and an insert interposed between said dished base of the nut and the outer edge wall of said notch, said insert providing said flat abutment surface and having opposite lugs bent into engagement with opposite of the flat sides of the nut and with opposite sides of said notched plate to secure the parts in proper relative position.

LEONARD W. SCHAPER.